Feb. 7, 1939.  F. C. F. PORTAIL  2,146,348

PRIMARY BATTERY

Filed May 12, 1936

F. C. F. Portail
INVENTOR

By Glascock Downing & Seebold
ATTYS

Patented Feb. 7, 1939

2,146,348

UNITED STATES PATENT OFFICE 2,146,348

PRIMARY BATTERY

Fernand Charles Frédéric Portail, Gennevilliers, France, assignor to Société Anonyme le Carbone, Gennevilliers, France Application May 12, 1936, Serial No. 79,322
In France March 3, 1936

8 Claims. (Cl. 136—100)

The present invention relates to batteries and more particularly pertains to primary cells having soluble electrodes.

In the pending United States application filed on April 4, 1934, under Serial No. 718,981 are described a process and a device allowing to remedy some inconveniences which sometimes occur when primary batteries are connected together and which can be regarded as due to a form of polarization of the soluble electrode. This process essentially consists in associating with the main soluble electrode one or more auxiliary soluble electrodes so arranged as to polarize to a lesser extent than the main soluble electrode and to thus ensure depolarization of the latter.

It has however been found that, particularly when the electrolyte is rendered solid, the cold slows down the depolarizing action of the auxiliary electrodes, this causing a reduction of the voltage of the cell.

The object of the present invention is to remedy this inconvenience and essentially consists in interposing, between the main soluble electrode and the first auxiliary soluble electrode, a semi-pervious wall made of a material allowing exchanges of products, but having no chemical action on the constituents of the battery. This material can, for instance, be composed of glass silk.

The new improved cell is therefore divided into two compartments by the semi-pervious wall above mentioned. In one of the compartments are arranged the insoluble electrode and the main soluble electrode. In the second compartment is arranged the first auxiliary soluble electrode.

In order that the invention may be more clearly understood, a form of carrying it into practice will be described by way of example.

Figure 1:
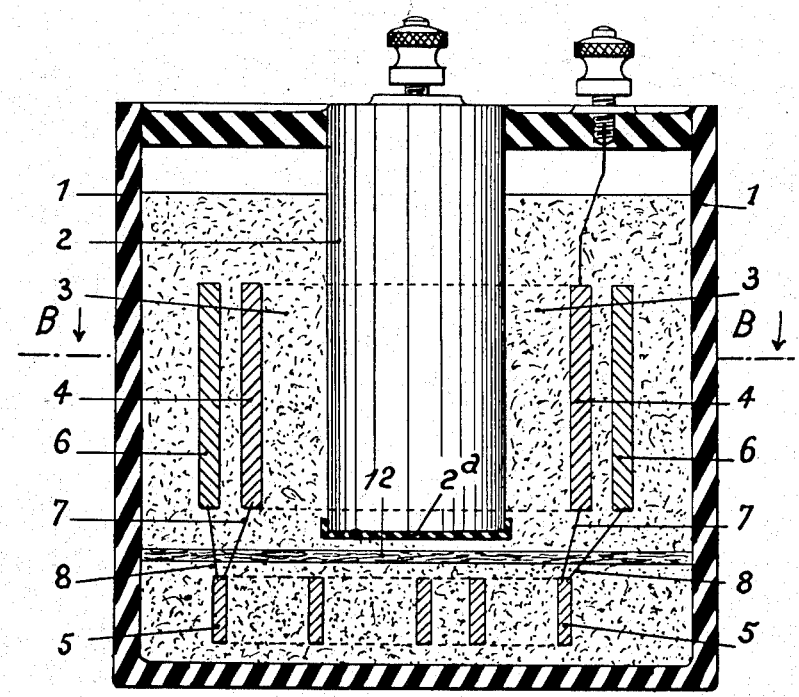
Fig. 1 is a diagrammatic partial section made according to line A—A of Fig. 2, showing a cell according to the invention.
Figure 2:
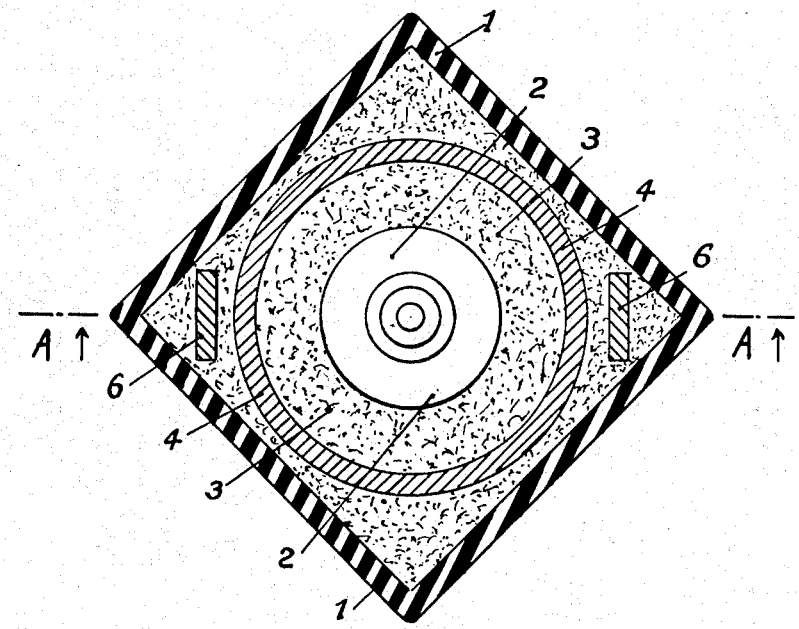
Fig. 2 is a plan view, partially in section according to line B—B of Fig. 1, showing the same cell.

In the drawing, 1 designates the jar containing the cell and made of fluid-tight and insulating material, for instance of moulded material, internally lined or not with a layer of paraffin; 2 designates the insoluble electrode which is made, for instance, of depolarizing porous carbon and the bottom of which is preferably, insulated from the electrolyte by a layer 2ª of moulded material, such as "Bakelite", or of plastic material, such as pitch; 3 designates the electrolyte which is, for instance an alkaline electrolyte and rendered solid in a suitable manner; 4 designates the main soluble electrode having, for instance, the shape of a zinc cylinder, slotted or not and the thickness of which can decrease from top to bottom.

A first auxiliary electrode 5 is arranged underneath a layer of semi-pervious material 12 constituted, for instance, by a small thickness of glass silk extending throughout the section of the cell underneath the electrodes 2 and 4.

The electrode 5 can conveniently be constituted by a zinc strip wound in a spiral and arranged at a small distance from the bottom of the cell.

Two other auxiliary electrodes 6, preferably in the shape of zinc blades or strips are arranged outwardly of the electrode 4 relatively to the electrode 2 and above the layer of glass silk. The electrodes 4, 5 and 6 are connected by electric conductors such as 7 and 8 passing through the semi-pervious layer.

In view of the cell arrangement concentration of the products of the reaction has a tendency to increase in the compartment containing the insoluble electrode 2 so that at the end of a given period, the phenomenon of osmotic pressure occurs and the diffusion of the reaction products toward the lower compartment below the semi-pervious wall 12 is accelerated by the presence of the semi-pervious wall. In other words if the semi-pervious wall were omitted there would be only a natural diffusion due to the differences of concentration and in a battery with a solid electrolyte subjected to a low temperature, this diffusion will be extremely slow.

Finally, it can be advantageous to fill each of the compartments of the cell with electrolytes having different contents in material for rendering them solid. Preferably, the material for rendering the electrolytes solid is more concentrated above the wall 12 than below the same. The concentration above said wall can be the usual concentration and it can be less underneath, or the lower layer can be normally concentrated and the upper layer can be more concentrated.

The battery thus constituted can last a very long time, without polarizing, and by remaining nearly unaffected by lowering of the temperature.

The arrangements described above are given by way of example only; all the details of construction, shapes, dimensions and materials used can vary according to circumstances without departing thereby from the principle of the invention.

I claim:

1. A primary battery, comprising in combination a jar, an electrolyte in said jar, a semi-pervious wall immersed in the said electrolyte and dividing the said jar into two compartments, an insoluble electrode arranged in a first compartment of the jar, a group of soluble electrodes in said first compartment, a second soluble electrode contained in the other compartment, and electric connections between the soluble electrodes.

2. A primary battery, comprising in combination a jar, an electrolyte in said jar, a semi-pervious wall immersed in the said electrolyte and dividing the jar into two compartments, an insoluble electrode in a first compartment of the said jar, a main soluble electrode arranged in the same compartment as the insoluble electrode opposite an active surface thereof and separated therefrom by a practically constant thickness of electrolyte, said main soluble electrode being entirely immersed in the electrolyte, auxiliary soluble electrodes electrically connected to the main soluble electrode and immersed in the electrolyte, and one of said auxiliary electrodes being situated in the other compartment of the said jar.

3. A primary battery comprising a jar, an electrolyte in said jar, a semi-pervious wall immersed in said electrolyte and dividing the jar into two compartments, said semi-pervious wall being formed of a material allowing diffusion therethrough but without chemical reaction on the constituents of the battery, an insoluble electrode contained in a first compartment of said jar, a first group of soluble electrodes contained in said first compartment, a second soluble electrode contained in the other compartment of the jar, and electric connections between the soluble electrodes.

4. A primary battery comprising a jar, an electrolyte in said jar, a semi-pervious wall immersed in the said electrolyte and dividing the jar into two compartments, said semi-pervious wall being formed of a material allowing diffusion therethrough but without chemical reaction on the constituents of the battery, an insoluble electrode arranged in a first compartment of said jar, a main soluble electrode situated directly opposite an active surface of said insoluble electrode and separated therefrom by a practically constant thickness of electrolyte, said main soluble electrode being entirely immersed in the electrolyte, auxiliary soluble electrodes electrically connected to the main soluble electrode, one of said auxiliary electrodes situated in the compartment of the jar which does not contain the said main soluble electrode.

5. A primary battery comprising a jar, an electrolyte in said jar, a semi-pervious wall immersed in the said electrolyte and dividing said jar into two compartments, an insoluble electrode contained in a first compartment of the jar, a main soluble electrode situated directly opposite an active surface of the said insoluble electrode and separated therefrom by a practically constant thickness of electrolyte, said main soluble electrode being entirely immersed in the electrolyte, an auxiliary soluble electrode immersed in the electrolyte below the main soluble electrode and insoluble electrode in the compartment which does not contain said main soluble electrode and said insoluble electrode, a second auxiliary electrode immersed in the electrolyte arranged in the same compartment as the insoluble electrode and the main soluble electrode, said second auxiliary soluble electrode being separated from the insoluble electrode by the main soluble electrode, electric connections between the main soluble electrode and the first auxiliary soluble electrode and between the first auxiliary soluble electrode and the second auxiliary soluble electrode.

6. A primary battery comprising in combination a jar, an electrolyte in said jar, a semi-pervious wall immersed in the said electrolyte and dividing the said jar into two compartments, an insoluble electrode in a first compartment of the said jar, a main soluble electrode situated in the same compartment as said insoluble electrode, an auxiliary soluble electrode contained in the other compartment of the jar and electrically connected to the said main soluble electrode.

7. A primary battery comprising in combination, a jar, an electrolyte in said jar, a semi-pervious wall immersed in the electrolyte and dividing the jar into two compartments, said semi-pervious wall being formed of a material allowing diffusion therethrough but without chemical reaction on the constituents of the battery, an insoluble electrode contained in a first compartment of the jar, a main soluble electrode situated in the same compartment as said insoluble electrode, an auxiliary soluble electrode contained in the other compartment of the jar and electrically connected to the said main soluble electrode.

8. In a primary battery, a jar, an electrolyte in said jar, a semi-pervious wall immersed in the said electrolyte and dividing said jar into two compartments, an insoluble electrode contained in a first compartment of the jar, a first group of soluble electrodes contained in the same compartment as said insoluble electrode, a second soluble electrode contained in the other compartment, the electrolyte contained in the first compartment having a greater degree of solidification than the electrolyte in the second compartment, and electric connections between the soluble electrodes.

FERNAND CHARLES FRÉDÉRIC PORTAIL.